(12) United States Patent
Kim et al.

(10) Patent No.: US 6,917,811 B2
(45) Date of Patent: Jul. 12, 2005

(54) METHOD FOR DYNAMICALLY ASSIGNING CHANNEL IN REAL TIME BASED ON GENETIC ALGORITHM

(75) Inventors: Sang Taek Kim, Seoul (KR); Jong Hyun Lee, Kyoungki-do (KR); In Hwan Hwang, Seoul (KR); Sung Soo Kim, Kangwon-do (KR); Kwang Jin Han, Kyoungki-do (KR)

(73) Assignee: KT Corporation (KR)

( * ) Notice: Subject to any disclaimer, the term of this patent is extended or adjusted under 35 U.S.C. 154(b) by 366 days.

(21) Appl. No.: 10/329,268

(22) Filed: Dec. 24, 2002

(65) Prior Publication Data

US 2003/0171122 A1 Sep. 11, 2003

Related U.S. Application Data

(60) Provisional application No. 60/343,675, filed on Dec. 27, 2001.

(51) Int. Cl.[7] .................................................. H04Q 7/20
(52) U.S. Cl. ........................ 455/452; 455/450; 455/451; 455/453; 370/329
(58) Field of Search ................................ 455/450–453, 455/509; 370/329

(56) References Cited

U.S. PATENT DOCUMENTS 6,023,459 A * 2/2000 Clark et al. ................. 370/329
2001/0001764 A1 * 5/2001 Davarian et al. ............ 455/522
2003/0050067 A1 * 3/2003 Rozmaryn ................... 455/447
2003/0181210 A1 * 9/2003 Shipman ..................... 455/446
2004/0043764 A1 * 3/2004 Bigham et al. ............ 455/422.1
2004/0266457 A1 * 12/2004 Dupray ..................... 455/456.5

* cited by examiner

*Primary Examiner*—W. R. Young
*Assistant Examiner*—Suhail Khan
(74) *Attorney, Agent, or Firm*—Blakely Sokoloff Taylor & Zafman

(57) ABSTRACT

Provided is a real-time dynamic channel assignment method based on a genetic algorithm in a radio communication system, and a computer-readable recording medium for recording a program implementing the method. The channel assignment method in accordance with the present invention has following advantages. First, an evaluation function clearly shows the difference between chromosomes, which represents channel assignment, can be set. Second, the efficiency in calculation time and memory capacity is increased by representing the assignment of channels arranged in one-dimensional using inherent channel numbers. Third, by controlling the Elitist pool crossover method and mutation probability properly, diversity is pursued in the initial process of the evolution program, and then as generation repeats, the convergence is enhanced so as to increase the efficiency in obtaining the optimum solution.

7 Claims, 6 Drawing Sheets

METHOD FOR DYNAMICALLY ASSIGNING CHANNEL IN REAL TIME BASED ON GENETIC ALGORITHM

This is a non-provisional application claiming the priority of Provisional Application No. 60/343,675 filed on Dec. 27, 2001.

FIELD OF THE INVENTION

The present invention relates to a real-time dynamic channel assignment method based on a genetic algorithm in a radio communication system, and a computer-readable recording medium for recording a program implementing the method; and, more particularly, to a real-time dynamic channel assignment method using a genetic algorithm in which resources can be used efficiently, and a computer-readable recording medium for recording a program implementing the method, when channel demand by each cell of a radio communication network is different and indefinite according to the radio communication service area and time.

DESCRIPTION OF RELATED ART

A problem with the general radio communication system is that the usable channels are limited systematically. To ensure efficient use of the channels within the usable range, it is necessary to design channels to be assigned optimally to each cell.

Accordingly, designers of radio communication networks call for a channel assignment method that can assign channels optimally within the predefined range of usable channels insofar as no inter-channel interference occurs. The interference effect, which is caused between channels assigned to a cell or cells, can be classified into three types; Co-channel interference (CCI), co-site interference (CSI), and adjacent-channel interference (ACI).

CCI indicates the level of interference that occurs when users in different cells use the same channel. CSI shows the level of interference that occurs when users in the same cell uses different channels, and ACI denotes the level of interference that occurs between channels, each assigned to different cells.

These three interference effects should be considered in order to assign channels optimally on a radio communication network. The interferences can be expressed in a compatibility matrix, in which the minimum channel spacing that does not occur the three interferences is expressed in a two-dimensional matrix having the number of cells as its rows and columns.

Here, the channel assignment can be classified into two types: Fixed channel assignment (FCA) and dynamic channel assignment (DCA). FCA is to assign a fixed number of channels to every cell. On the other hand, DCA is to assign channels as many as demanded to cells in time of need dynamically. FDA is effective, when there is a great deal of communication in general on a radio communication network, but it is not, when the amount of communication is increased in a certain service area. On the other hand, DCA is effective, when the number of channels demanded by a cell varies a lot depending on time, although the variance of the channel demand is indefinite.

The matter of channel assignment has been regarded as an "NP-hard", and it has used an algorithm that figures out the optimum approximate value. Among the methods for finding optimum approximate values are graph theory, simulated annealing, neural network, and the like. In particular, the simulated annealing method may be used to overcome the problem that the number of channels converges to the local optimum value, but this method has shortcomings that the convergence is not performed fast, and that parameters should be selected very discreetly.

Accordingly, in the DCA method, an optimum channel assignment method applied to an evolution program that can provide as many channels as demanded by each cell within a limited time on a radio communication network, while the number of channels does not converge into the local optimum number, so as to relieve the burden of calculating the number of channels in need, and overcome the limitation of the conventional channel assignment method.

SUMMARY OF THE INVENTION

It is, therefore, an object of the present invention to provide a real-time dynamic channel assignment method using a genetic algorithm, in which resources can be used efficiently by applying a dynamic channel assignment method to an evolution program and assigning channels required by each cell dynamically in real-time, when cells needs channels on a radio communication network, where the channel demand varies depending on the area and time of the radio communication service, and a computer-readable recording medium for recording a program to implement the method.

In accordance with an aspect of the present invention, there is provided a real-time dynamic channel assignment method using a genetic algorithm in a radio communication system, comprising the steps of: generating an initial chromosome by arranging inherent channel numbers in one-dimensional as many as channels demanded by each cell based on the radio communication service area; taking a certain channel of the chromosome as a reference channel and indicating the level of interference between the reference channel and each of the other channels to estimate the initial chromosome generated above; determining a chromosome application number ($F_E$) of an Elitist pool type to be applied to each generation, and then performing crossover in a partially mapped crossover method in order not to generate the same channel in the same cell and determining the mutation probability ($F_m$); and estimating the fitness level and the level of interference between the channels, and storing materials for exchanging recessive chromosomes for dominant chromosomes in the Elitist pool method according to the estimation result, and then updating the Elitist pool with the chromosomes having the highest fitness level in order.

In accordance with another aspect of the present invention, there is provided a computer-readable recording medium for recording a program in a radio communication system provided with a processor, comprising the step of: generating an initial chromosome by arranging inherent channel numbers in one-dimensional as many as channels demanded by each cell based on the radio communication service area; taking a certain channel of the chromosome as a reference channel and indicating the level of interference between the reference channel and each of the other channels to estimate the initial chromosome generated above; determining a chromosome application number ($F_E$) of an Elitist pool type to be applied to each generation, and then performing crossover in a partially mapped crossover method in order not to generate the same channel in the same cell and determining the mutation probability ($F_m$); and estimating the fitness level and the level of interference between the channels, and storing materials for exchanging recessive chromosomes for dominant chromosomes in the Elitist pool method according to the estimation result, and then updating the Elitist pool with the chromosomes having the highest fitness level in order.

The purpose of the present invention is to develop a dynamic channel assignment (DCA) method that can minimizes the level of interference between channels, using an evolution program. The channel assignment method of this invention has following features. First, this method suggests an evaluation function that distinctively shows the difference between chromosomes that represent channel assignment. Second, it enhances the efficiency in calculation time and memory capacity by expressing the assignment of channels in inherent channel numbers arranged in one-dimensional. Third, this method pursues diversity in the initial process of the evolution program by using a modified Elitist Pool crossover method and controlling the mutation probability appropriately, and enhances efficiency in obtaining the optimum solution by emphasizing convergence as generation repeats.

BRIEF DESCRIPTION OF THE DRAWING(S)

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
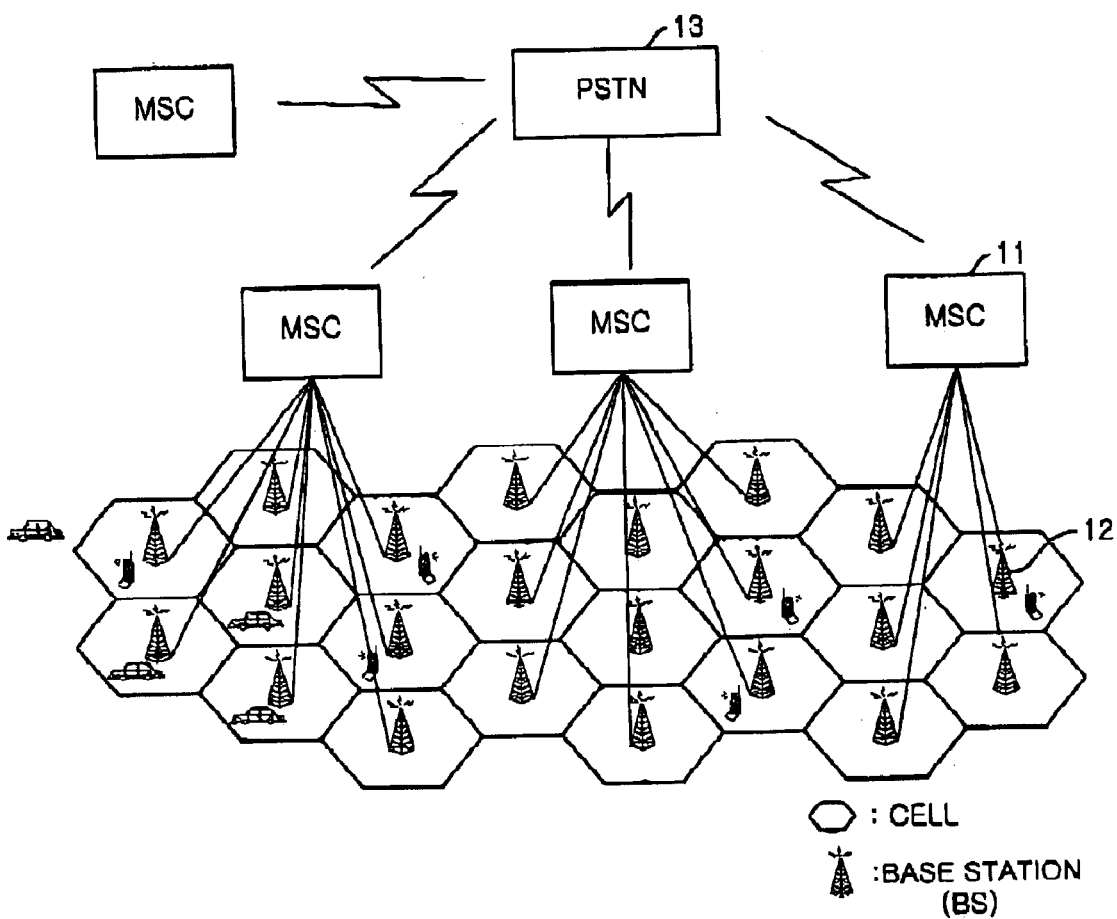
FIG. 1 is an exemplary view showing a radio communication system in accordance with the present invention.

Referring to FIG. 1, which shows a radio communication system of the present invention, the reference numerals '11' denotes a mobile telephone switching office (MTSO); '12,' a base station (BS); and '13,' a public switched telephone network (PSTN).

As shown in the drawing, a radio communication service area consists of a plurality of cells. Located in the center of each cell is a base station (BS) 12, which connects the mobile telephone switching office (MTSO) 11 and the mobile terminals moving in the cell. Each MTSO 11 administrates the cells in the area assigned to it, assigns channels to the cells properly, and is connected with the PSTN 13.

Figure 2:
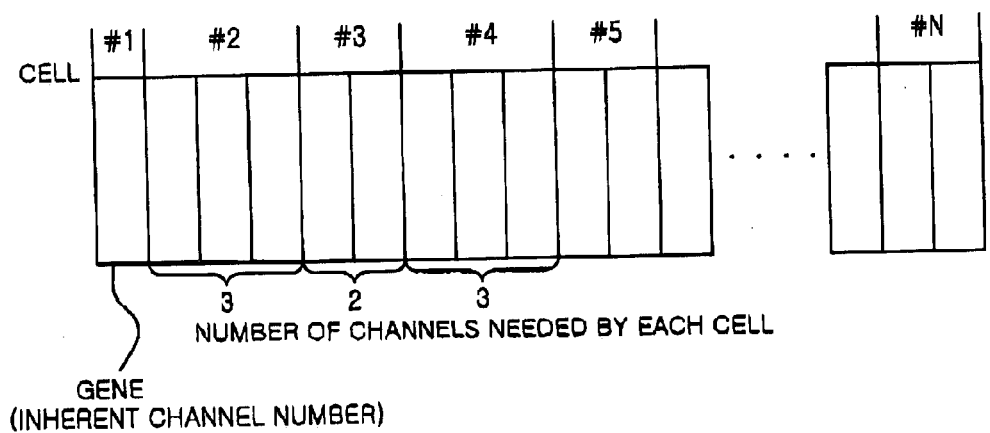
FIG. 2 is a diagram illustrating chromosomes arranged in one-dimensional in accordance with the present invention.

FIG. 2 illustrates chromosomes arranged in one-dimensional in accordance with the present invention. It also shows how a chromosome is expressed in the present invention and how the initial chromosome is generated. That is, from the drawing, it is shown that a chromosome has N number of cells and the first cell needs one channel, while the second cell requires three channels. The matter what channel of an inherent number to assign to cells is determined from an evolution program of the present invention.

A chromosome is expressed by arranging inherent channel numbers as many as needed channels in one-dimensional consecutively. Expressing a chromosome in one-dimensional is more efficient in calculation time and memory capacity than expressing a chromosome in a two-dimensional matrix in the process of the evolution program, such as crossover and mutation.

When an initial chromosome is generated, inherent channel numbers are assigned to the genes of the chromosome. The inherent channel numbers are generated as many as the usable channels randomly. To each cell, channels having the same inherent channel number are not assigned. In short, the same channel is not assigned to a cell.

The fitness level of a chromosome is computed by calculating how much the chromosome satisfies a compatibility matrix, which presents the level of interference between channels assigned to the chromosome, and giving penalty as much as the difference with a channel that breaks the channel limitation. The penalty for the CSI, CCI, and ACI that occur in a chromosome is calculated, based on the information on how many cells each chromosome has and how many channels are demanded by the cells.

In order to estimate a chromosome that expresses a particular channel assignment, the interference level of one certain channel with other channels can be expressed as an evaluation function, which is as shown in Equation 1. In short, the difference between channels that break the compatibility matrix is minimized. The following Equations 1, 2, and 3 are what are modified from the evaluation functions suggested by Smith (1998) into a form suitable for expressing a chromosome in one-dimensional in accordance with the present invention, instead of two-dimensional expression. Accordingly, the evaluation functions of the present invention can easily differentiate and estimate the evaluation function values between chromosomes. In addition, unnecessary time for calculation and memory capacity can be reduced remarkably by expressing chromosomes in one-dimensional, as suggested in the present invention.

An evaluation function of the present invention is defined as shown in Equation 1.

$$\text{Min} \sum_{i=1}^{N} \sum_{k=1}^{D_i} \sum_{j=1}^{N} \sum_{l=1}^{D_j} P_{ij}(|X_{ik} - X_N| + 1) \quad \text{Eq. 1}$$

The limitation equation is as shown in Equation 2.

$$P_{i,j,m+1} = \max(0, P_{i,j,m} - 1) \quad \text{Eq. 2}$$

$$P_{i,j,1} = \begin{cases} C_{ij}, & \text{if } i \neq j \\ 0, & \text{if } i = j \end{cases} \quad i, j = 1, 2, 3, \ldots, N, \quad \text{Eq. 3}$$

$k = 1, \ldots, D_i$, and $l = 1, \ldots, D_j$.

In the above equations, N denotes the number of cells, and $X_{ik}$ denotes an inherent channel number assigned to the $k^{th}$ gene of the $i^{th}$ cell. The inherent channel numbers are selected in the range of usable channels. That is, if the number of usable channels is M, the inherent channel numbers are selected from $1, 2, \ldots, M$. $P_{i,j,m}$ denotes penalty that is given when the channel difference (m−1) between the channel $X_{ik}$ and channel $X_{jl}$ does not conform to a compatibility matrix. $C_{ij}$ denotes a compatibility matrix, and $D_i$ denotes the channel demand of a cell.

In Equation 2, $P_{i,j,m+1} = \max(0, P_{i,j,m} - 1)$, it is assumed that the penalty decreases by 1, when the difference between the channels of a cell i and a cell j is increased by one channel, that is, the channel interference level is reduced. In case where i≠j, the equation represents the interference level between different channels in different cells, which is the ACI. If i=j, the equation comes to present the interference level between different channels in the same cell, which is the CSI. When $P_{i,i,m+1}$ or $P_{j,j,m+1}$ is calculated to calculate the CSI, the $C_{ii}$ or $C_{jj}$ value is applied to the $P_{i,i,1}$ or $P_{j,j,1}$ value of Equation 2, instead of the value of Equation 3.

In Equation 3, if i=j, the value of $P_{i,j,1}$ equals to '0.' Here, i and j are assumed equal in order nor to compare the two channels, because assume it is assumed that identical channels can not exist in the same cell. If i≠j, $P_{i,j,1}$ equals to $C_{ij}$. Here, if two identical channels are assigned to different cells, penalty is given for the interference between the two cells marked in the compatibility matrix, which is the CCI representing the level of interference between the identical channels in different cells.

Figure 3:
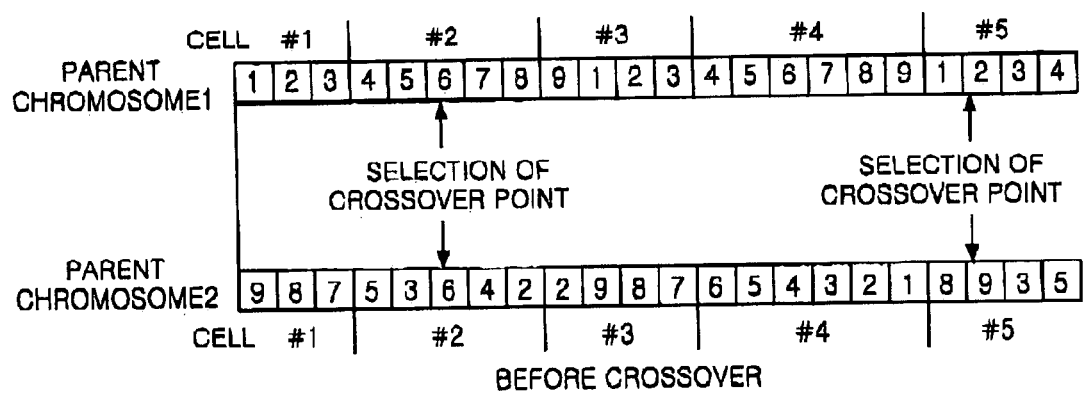
FIG. 3 is a diagram describing the chromosomes arranged in one-dimensional before the performance of a partially mapped crossover (PMX) in accordance with the present invention.

FIG. 3 describes the chromosomes arranged in one-dimensional before the performance of a partially mapped crossover (PMX) in accordance with the present invention. As shown in the drawing, random numbers are generated as many as the chromosomes in the chromosome population, and chromosomes having random numbers smaller than the crossover probability are selected, and coupled in order. In case where there are odd numbers of chromosomes, one chromosome among the selected chromosomes is ruled out from the objects of crossover to maintain even numbers of chromosomes for crossover. Crossover is performed at two crossover points. Two chromosomes to be crossed over are selected, and crossover points are determined at random to exchange the gene String in the crossover portion of one chromosome with that of the other chromosome. Here, if the genes inserted in a partially mapped crossover (PMX) method and the genes originally existing in the chromosome has the same inherent channel number, the repeated number of the inserted gene is changed the number of the exited gene.

Figure 4:
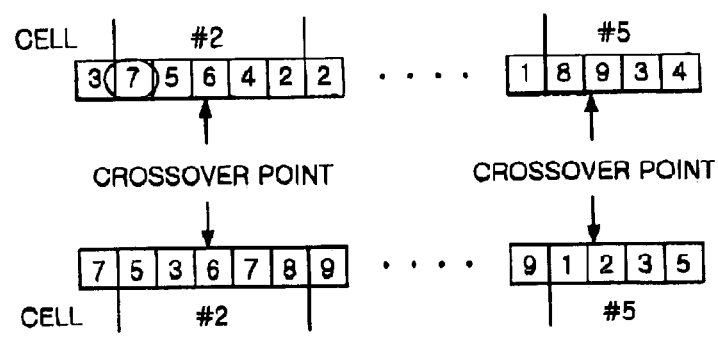
FIG. 4 is a diagram depicting the chromosomes after the PMX in accordance with the present invention (The assignment of the same channel to the same cell is prevented.)

Referring to FIGS. 3 and 4 that describe the PMX method, there are some cells between the two crossover points, and the cells #3 and #4 of FIG. 3 can be exchanged as a whole. Therefore, the identical channel is not repeated in the same cell here. However, as shown in FIG. 4, based on the two genes which are selected as crossover points, i.e., the third gene of the cell #2, and the second gene of the cell #5, a chromosome having the same genes (i.e., the same inherent channel numbers) assigned to the same cell can be generated. Accordingly, the starting point, which is the third gene of the cell #2, and the ending point, which is the second gene of the cell #5, should be checked in order not to assign the same channel that already exists in the cell to the same cell.

FIG. 4 is a diagram depicting the chromosomes after the PMX in accordance with the present invention, where the assignment of the same channel to the same cell is prevented. As illustrated in the drawing, although the chromosomes are crossed over, there is no problem, because the whole genes in the cells #3 and #4 are exchanged, but the same channels may be assigned to the cells #2 and #5. Therefore, the cells #2 and #5 of the offspring chromosomes 1 and 2 that are generated from the crossover process need to be checked if there are iterated channels. In the second cell of the offspring chromosome 1, since the inherent channel number 4 is repeated, the first inherent channel number 4 of the second cell in the offspring chromosome 1 is changed to 7 to prevent the iteration of the same channel.

There are many crossover methods, but the PMX method is used usefully in assigning channels to prevent the repetition of the same channel in the same cell.

Figure 5:
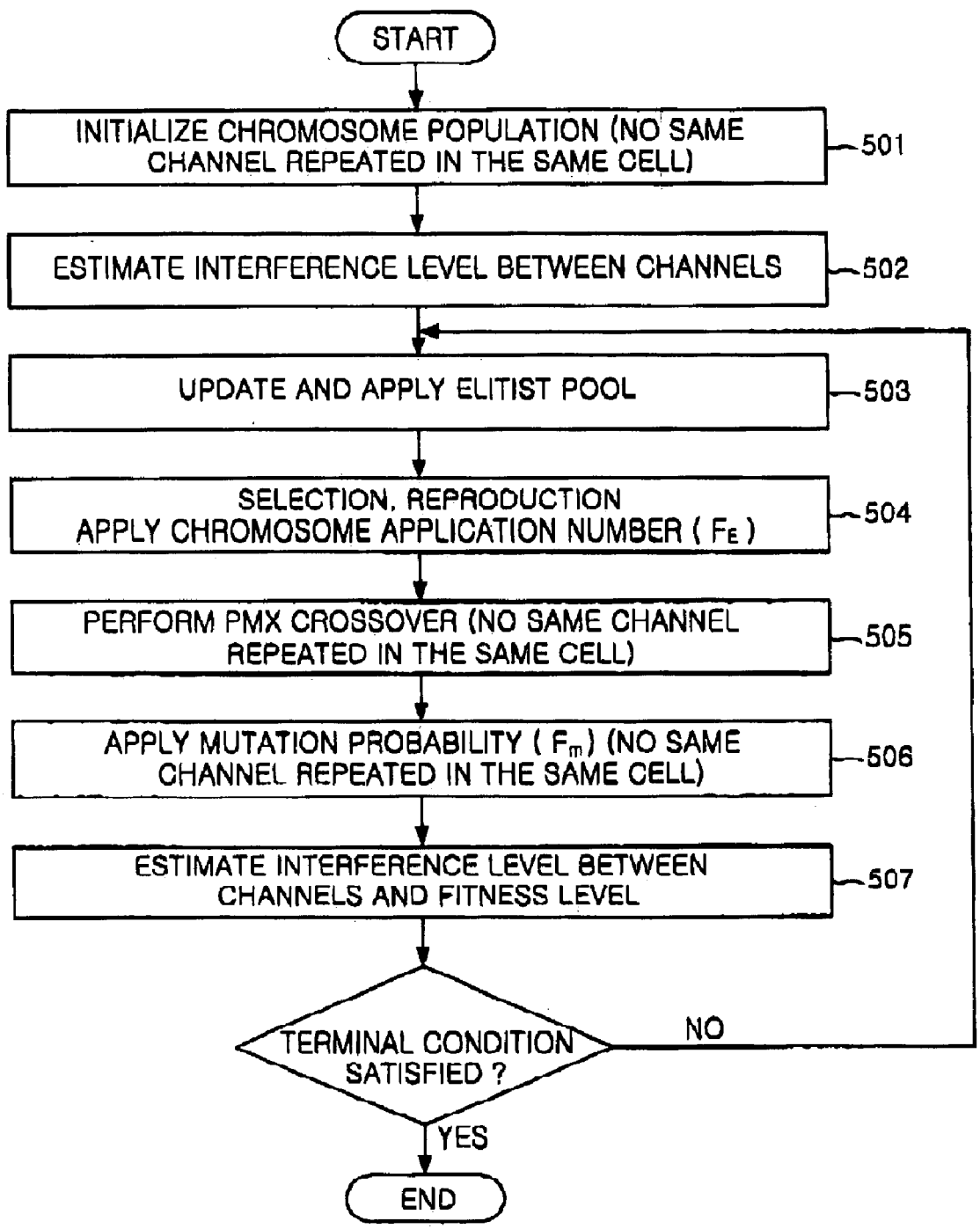
FIG. 5 is a flow chart showing a real-time dynamic channel assignment method using a genetic algorithm in a radio communication system in accordance with the present invention.

FIG. 5 is a flow chart showing a real-time dynamic channel assignment method using a genetic algorithm in a radio communication system in accordance with the present invention.

As shown in the drawing, at step 501, an initial chromosome is generated not to have the same channels assigned to the same cell in the evolution program.

At step 502, a fitness function value of each chromosome is calculated in the subsequent step of estimating the chromosome between channels to estimate the interference level between channels.

At step 503, an Elitist pool is updated in every generation with chromosomes having the highest fitness level in order to store materials for exchanging recessive chromosomes and dominant chromosomes with each other, and the convergence of the evolution program is enhanced by performing the exchange between the recessive chromosomes and the dominant chromosomes, when the Elitist pool needs to be used.

At step 504, the application number ($F_E$) in the form of "Elitist pool" to be applied to each generation is determined so as to exchange recessive chromosomes for dominant chromosomes as many as $F_E$, and at step 505, when more that two chromosomes are selected, new chromosomes are generated by exchanging genes between the two chromosomes of a pair, so that the same channels are not crossed over in the same cell in the PMX method. Accordingly, at step 506, a mutation probability ($F_m$) is applied in order not to assign the same channels to the same cell, and then the mutation probability is decreased, as generation repeats.

After the final mutation is completed, at step 507 where a new chromosome population is estimated, the channel interference and fitness levels are estimated for each chromosome. Then, if terminal condition is satisfied, the logic flow is ended. Otherwise, the logic flow returns to the step 503 where the Elitist pool is updated and applied, and repeats the subsequent steps to proceed for the next generation.

The real-time dynamic channel assignment method using a genetic algorithm having the above architecture in a radio communication system of the present invention will be described more in detail, hereinafter.

Figure 6:
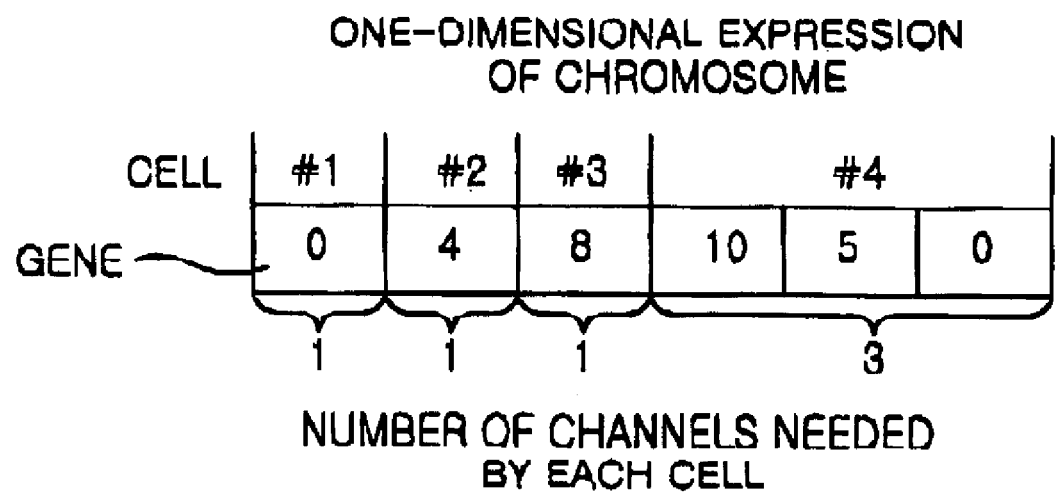
FIG. 6 is an exemplary view describing the process of assigning 11 channels to four cells by using the evolution program in accordance with the present invention.

FIG. 6 describes the process of assigning 11 channels to four cells by using the evolution program in accordance with the present invention. As shown in FIG. 6, the radio communication network model has four cells, and the cells requires a total of six channels, each requiring 1, 1, 1, and 3 channels. The inherent channel numbers currently available here are from 0 to 10, which are 11 in total. The compatibility matrix for assigning channels on a network having four cells is as follows.

$$C = \begin{pmatrix} 5 & 4 & 0 & 0 \\ 4 & 5 & 0 & 1 \\ 0 & 0 & 5 & 2 \\ 0 & 1 & 2 & 5 \end{pmatrix}$$

Here, the columns and rows denote cells, and the numbers in the above matrix indicates minimum space between channels that does not occur interference between the cells. The number '5' in the diagonal line of the matrix means that the space between channels should be more than 5 at least in order not to occur interference between the channels in the same cell, which is the CSI. The other numbers in the matrix except the numbers in the diagonal line indicate the CCI and ACI. The number of '0' means that no interference occurs between the corresponding cells, no matter what kind of a channel is assigned to the cells, including the identical channel.

In this invention, a population of 10 chromosomes is formed at the beginning to figure out the optimum solution, and both crossover and mutation probabilities are set to be 0.3. However, the mutation probability is decreased gradually to enhance the convergence as generation repeats.

In the evolution program, the initial chromosomes population is formed as shown in Table 1.

At step 501, the initial chromosome is generated, not assigning the same channel to the same cell.

At step 502 where the chromosome is estimated, the fitness function value of each chromosome is calculated to obtain the interference level. The fitness function values are the reciprocal number of the interference level to adopt a roulette wheel selection method.

As shown in Equation 1, when channels are assigned, the interference level between channels is taken as penalty in the evaluation function. So, the sum total of penalty should be minimized. Since the value of the fitness function is the reciprocal number of the interference level, the chromosome '8', which has the largest interference level, has the smallest fitness function value, while the chromosome '6' having the smallest interference has the largest fitness function value. The interference level indicates the difference between channels that breaks the minimum channel difference that does not occur interference, which is marked in the compatibility matrix. That is, the interference level shows how far apart the difference between channels that is given as a limitation, and the difference between channels that breaks the limitation are from each other. In the first generation of the evolution program, the sum total of fitness functions of the respective chromosomes, i.e., total fitness level, is 2.1, and the sum total of the interferences of the chromosomes is 87.

At step 503, an Elitist pool is updated in every generation with chromosomes having the highest fitness level in order to store materials for exchanging recessive chromosomes for dominant chromosomes, and the convergence of the evolution program is enhanced by performing the exchange between the recessive chromosomes and the dominant chromosomes, when the Elitist pool needs to be applied.

TABLE 1

| Individual | Assigned Channel | Interference Level | Value of Fitness Function | Selection Probability (p) | Accumulated Probability (q) |
|---|---|---|---|---|---|
| v0 | 0 6 2 8 6 5 | 10 | 0.100000 | 0.048322 | 0.048322 |
| v1 | 3 9 9 8 1 9 | 8 | 0.125000 | 0.060403 | 0.108725 |
| v2 | 7 5 3 0 1 4 | 10 | 0.100000 | 0.048322 | 0.157047 |
| v3 | 1 1 10 4 1 0 | 12 | 0.083333 | 0.040268 | 0.197315 |
| v4 | 0 4 5 6 1 7 | 5 | 0.200000 | 0.096644 | 0.293960 |
| v5 | 4 3 0 6 8 5 | 12 | 0.083333 | 0.040268 | 0.334228 |
| v6 | 3 9 7 10 5 1 | 1 | 1.000000 | 0.483221 | 0.817450 |
| v7 | 5 2 9 2 8 9 | 9 | 0.111111 | 0.053691 | 0.871141 |
| v8 | 10 10 6 4 2 3 | 15 | 0.066667 | 0.032215 | 0.903356 |
| v9 | 9 0 4 1 7 0 | 5 | 0.200000 | 0.096644 | 1.000000 |
| Total | | 87 | 2.069444 | | |

Two significant factors in the evolutionary process of exploring genes are diversity of a chromosome population and the intensity of selection. The two factors are closely related to each other. When the selection intensity increases, the diversity of the chromosome population is reduced, whereas decreased selection intensity leads to increasing diversity. In other words, high pressure for selection can hardly incur early convergence, or secure the optimum solution. On the other hand, low selection intensity drops the efficiency of gene exploration. Therefore, balancing the two factors affects the selection and reproduction of chromosomes considerably. In this evolution program for exploring multi-optimum paths of the present invention, the initial generation starts with enhanced diversity and low selection intensity, and then as generation repeats, the selection intensity is enhanced and the diversity is decreased. This invention adopts the Elitist pool method in order to help chromosome converge to the optimum solution quickly, but prevent the solution from going to the local optimum value. In the Elitist pool method, a predetermined number of chromosomes having highest values in each generation are stored in the Elitist pool, and after a predetermined number of generations pass, chromosomes having lowest values of the generation are exchanged for the chromosomes having highest values that have been stored in the Elitist pool. As expressed in Equation 4, the crossover probability of dominant chromosomes is increased by removing recessive chromosomes in the reproduction process to enhance the selection intensity, and increasing the number of dominant chromosomes, as generation repeats. Recessive chromosomes means chromosomes having low fitness function values, and dominant chromosomes are chromosomes having high fitness function values.

$$F_E = E\text{-Integral number}(E \times \beta^G) \qquad \text{Eq. 4}$$

Here, $F_E$ denotes a chromosome application number of the Elitist pool type to be applied to a generation G. E, $\beta$, and G denote the maximum application number of the Elitist pool type, weight (0<$\beta$<1), and generation (0,1,2,3, ... , N), respectively. The 'integral number' is determined by removing the decimal fraction from a real number. In the Elitist pool method, the number of chromosomes to be exchanged can be controlled by the output value of Equation 4.

Subsequently, chromosomes are selected for forming a new chromosome population by performing roulette wheel selection 10 times in every generation. The following 10 random numbers are generated from the range of [0,1].

| | | | | |
|---|---|---|---|---|
| 0.008789 | 0.918762 | 0.275879 | 0.272888 | 0.587891 |
| 0.691162 | 0.837585 | 0.726471 | 0.484924 | 0.205353 |

Since the first random number 0.008789 is smaller than the accumulated probability $q_0$ of the chromosome $v_0$, the chromosome $v_0$ is selected for the new chromosome population.

Since the second random number 0.918762 is larger than the accumulated probability $q_8$ of the chromosome $v_8$, and smaller than the accumulated probability $q_9$ of the chromosome $v_9$, the chromosome $v_9$ is selected for the new chromosome population.

Since the third random number 0.275879 is larger than the accumulated probability $q_3$ of the chromosome $v_3$, and smaller than the accumulated probability $q_4$ of the chromosome $v_4$, the chromosome $v_4$ is selected for the new chromosome population.

The final chromosome population selected this way is as shown below. At step 504, the chromosome application number $F_E$ of the Elitist pool type to be applied to each generation is determined from the above Equation 4, and recessive chromosomes are exchanged for dominant chromosomes as many as $F_E$.

| | |
|---|---|
| New chromosome $v_0'$ | 0 6 2 8 6 5 ($v_0$) |
| New chromosome $v_1'$ | 9 0 4 1 7 0 ($v_9$) |
| New chromosome $v_2'$ | 0 4 5 6 1 7 ($v_4$) |
| New chromosome $v_3'$ | 0 4 5 6 1 7 ($v_4$) |
| New chromosome $v_4'$ | 3 9 7 10 5 1 ($v_6$) |
| New chromosome $v_5'$ | 3 9 7 10 5 1 ($v_6$) |
| New chromosome $v_6'$ | 5 2 9 2 8 9 ($v_7$) |
| New chromosome $v_7'$ | 3 9 7 10 5 1 ($v_6$) |
| New chromosome $v_8'$ | 3 9 7 10 5 1 ($v_6$) |
| New chromosome $v_9'$ | 0 4 5 6 1 7 ($v_4$) |

Now, it is ready to apply crossover operators, recombination operators for giving a chromosome a higher value, to the chromosomes $v_1'$ of the new population. Since the crossover probability is 0.3, it is predicted that about 30% of the chromosomes are crossed over on the average. The crossover operation is performed by generating a random number b in the range of [0, 1] for each chromosome. Here, if b is smaller than 0.3, the chromosome is selected and crossed over. Random number progression for performing crossover operation is generated as follows.

| | | | | |
|---|---|---|---|---|
| 0.743713 | 0.468445 | 0.457947 | 0.949127 | 0.744415 |
| 0.108276 | 0.599030 | 0.385223 | 0.734985 | 0.608948 |

The chromosome selected for crossover operation from the above random number progression is $v_5'$. However, since crossover is performed between two chromosomes, when the number of chromosomes is odd, one chromosome is removed and not crossed over. At step 505, when more than two chromosomes are selected for performing crossover, genes are exchanged between the two chromosomes to thereby produce a new chromosome.

Mutation is carried out to diversify chromosomes by selecting a gene (i.e., an inherent channel number) within a chromosome at random according to the mutation probability, and changing it into another channel number that is generated randomly as well. Here, if the changed channel number already exists in the cell, another channel number is generated again at random so that the cell does not have the genes hating the same channel number. In the mutation process, random numbers are generated as many as the chromosomes of the chromosome population, and the mutation is performed as many times as the random numbers smaller than the mutation probability.

Mutation process is performed by selecting a chromosome to be mutated, determining the location of a cell having a gene to be mutated in the chromosome randomly; and determining a gene (channel number) to be mutated in the cell randomly. Finally, a channel number to replace the original channel is generated at random, compared with the inherent channel numbers of the other genes in the cell to see if there is the same channel number in the cell. If there is the same channel, another channel number is re-generated to replace the original channel number, and if there is no identical channel number, the generated channel number is confirmed and replaced with the original channel number. The purpose of mutation is to prevent the function values of the selected chromosomes from being determined at a local optimum value, and diversify the values of each chromosome.

It is good to pursue diversity and vary chromosome values in the early generations. However, pursuing diversity even after the optimum solution is approached inhibits the convergence of chromosome values and the obtaining of the approximate solution of the optimum value. If the difference between the fitness function values is insignificant, a chromosome having the optimum value is less likely to be selected. Thus the convergence into the optimum solution may be hindered due to the mutation. Therefore, to some extent, diversity can be pursued, but as generation repeats, the mutation probability should be reduced to make the solutions converge into the optimum solution naturally by using the following Equation 5.

$$F_m = m \cdot \alpha^G \qquad \text{Eq. 5}$$

$F_m$ denotes the mutation probability to be applied to a generation G, while $\alpha$, m and G denote a weight ($0<\alpha<1$), a mutation probability given to the initial period of generations, and a generation (0,1,2,3, . . . , N), respectively.

In the above Equation 5, when diversity is enhanced in the early generations, the mutation probability is made large, and as generation repeats, the mutation probability is made small to reduce diversity and increase the selection intensity. The mutation probability can be controlled by the variable $\alpha$.

The mutation probability, which is an operator for diversifying chromosome values, is applied to the chromosomes $v_1'$ of the new chromosome population. Since the mutation probability is 0.3, it is anticipated that about 30 per cent of the chromosomes is mutated on the average. The operation of mutation is performed by generating random numbers in the range of [0, 1] as many as the chromosomes in the chromosome population, and if a random number b is smaller than 0.3, mutation is performed. The progression of random numbers for performing mutation operation is generated as shown below.

| | | | | |
|---|---|---|---|---|
| 0.572388 | 0.361328 | <u>0.151550</u> | 0.989960 | 0.751526 |
| 0.345551 | <u>0.168976</u> | 0.504791 | <u>0.147491</u> | 0.303040 |

In the above progression, there are three random numbers smaller than 0.3. So, mutation occurs three-times. The generation order of random numbers has nothing to do with the order of chromosomes. Subsequently, a chromosome to be mutated is selected at random, and it is determined at random which cell has a gene to be mutated, and which one in the order of genes in the cell is to be mutated. Then, finally, a channel number to replace the original channel number is generated at random, compared with the other inherent channel numbers in the cell to see if there is the same channel already existing in the cell. If there is the same channel, another channel number to replace the original channel number is re-generated. Otherwise, the generated channel number is confirmed and the original channel is changed with it. Followings are the genes mutated in the above-described process.

In the first mutation, the channel 4 assigned to the second gene selected at random from the third chromosome $v_1'$ out of 10 chromosomes, is changed into a channel 5 that is not overlapped with the channel 4. In the second mutation, the channel 2 assigned to the second gene selected at random from the chromosome $v_6'$ is selected randomly and changed into 7 that is not overlapped with the channel 2. In the third mutation, the channel 0 assigned to the first gene selected at random from the chromosome $v_8'$ is selected randomly and changed into 7 that is not overlapped with the channel 0. After going through the mutation operation, a new chromosome population is formed as shown below. As generations proceed further, at step 506, the mutation probability of Equation 5 is reduced gradually to enhance the convergence, in comparison with the early generations where diversity is pursued.

In the evolution program, the estimation, crossover, and mutation processes of the chromosome population that occur during one generation are described so far. At step 507, when the mutation is completed, the values of channels assigned to the chromosome of the new chromosome population are estimated, and fitness function values are calculated to obtain the below result.

TABLE 2

| Individual | Assigned Channel | Interference Level | Value of Fitness Function | Selection Probability (p) | Accumulated Probability (q) |
|---|---|---|---|---|---|
| v0 | 0 6 2 8 6 5 | 10 | 0.100000 | 0.020089 | 0.020089 |
| v1 | 9 0 4 1 7 0 | 5 | 0.200000 | 0.040179 | 0.060268 |
| v2 | 0 5 5 6 1 7 | 5 | 0.200000 | 0.040179 | 0.100446 |
| v3 | 0 4 5 6 1 7 | 5 | 0.200000 | 0.040179 | 0.140625 |
| v4 | 3 9 7 10 5 1 | 1 | 1.000000 | 0.200893 | 0.341518 |
| v5 | 3 9 7 10 5 1 | 1 | 1.083333 | 0.200893 | 0.542411 |
| v6 | 5 7 9 2 8 9 | 9 | 0.111111 | 0.022321 | 0.564732 |
| v7 | 3 9 7 10 5 1 | 1 | 1.000000 | 0.200893 | 0.765625 |
| v8 | 3 9 7 10 5 1 | 1 | 1.000000 | 0.200893 | 0.966518 |
| v9 | 7 4 5 6 1 7 | 6 | 0.166667 | 0.033482 | 1.000000 |
| Total | | 44 | 2.069444 | | |

The sum total of the fitness function values of the respective chromosomes, i.e., total fitness level, is 5.0, and the sum total of the interference levels of the chromosomes is 44. From the result, it can be seen that the total fitness level is improved from 2.1 to 5.0, and the sum total of interference levels is improved from 87 to 44, in all generations. This means that the chromosomes are improved on the whole, compared to the chromosomes in the previous generation. At step 508, if the result satisfies the terminal condition, the logic flow is ended. Otherwise, the logic flow continues to proceed for the next generation.

Then, the logic flow goes through the selection process again, and continues to estimate the next generation by applying genetic operators, such as crossover and mutation, to produce evolved chromosomes as generations proceed.

When crossover is not performed in the first generation, the crossover process in the second generation is performed as follows. To select chromosomes for a new chromosome population, roulette wheel selection is performed 10 times, and 10 random numbers in the range of [0, 1] are generated as shown below.

| | | | | |
|---|---|---|---|---|
| 0.426544 | 0.070374 | 0.966583 | 0.683167 | 0.153229 |
| 0.877228 | 0.821655 | 0.582031 | 0.191345 | 0.177887 |

The final chromosome population selected in the above described method is as shown below.

| | |
|---|---|
| New chromosome $v_0'$ | 3 9 7 10 5 1 ($v_5$) |
| New chromosome $v_1'$ | 0 5 <u>5</u> 6 1 7 ($v_2$) |
| New chromosome $v_2'$ | 7 4 5 6 1 7 ($v_9$) |
| New chromosome $v_3'$ | 3 9 7 10 5 1 ($v_7$) |
| New chromosome $v_4'$ | 3 9 7 10 5 1 ($v_4$) |
| New chromosome $v_5'$ | 3 9 7 10 5 1 ($v_6$) |
| New chromosome $v_6'$ | 3 9 7 10 5 1 ($v_5$) |
| New chromosome $v_7'$ | 3 9 7 10 5 1 ($v_7$) |
| New chromosome $v_8'$ | 3 9 7 10 5 1 ($v_4$) |
| New chromosome $v_9'$ | 3 9 7 10 5 1 ($v_4$) |

To perform crossover operation, a random number progression is generated as follows.

| | | | | |
|---|---|---|---|---|
| 0.817169 | 0.475250 | 0.155548 | 0.503906 | 0.731995 |
| 0.405579 | 0.279572 | 0.568726 | 0.682220 | 0.755829 |

From the above random number progression, the chromosomes selected for crossover operation are the chromosome $v_2'$ and the chromosome $v_6'$. Once a pair of chromosomes to be crossed over is determined, genes for initiating and ending the crossover are selected by generating random numbers again. In the above pair of chromosomes $v_2'$ and $v_6'$, the gene string between the initiating and ending genes are crossed over. Here, the selected genes are the third and the fourth genes. Accordingly, the PMX crossover is performed as follows.

| | | | | |
|---|---|---|---|---|
| $v_2'$ | 7 4 \|5 6\| 1 7 → | $v_2''$ | 7 4 \|7 10\| 1 7 |
| $v_6'$ | 3 9 \|7 10\| 5 1 → | $v_6''$ | 3 9 \|5 6\| 5 1 |

After crossover, at step 505, the new chromosomes $v_2''$ and $v_6''$ join the chromosome population in place of the existing chromosomes $v_2'$ and $v_6'$ to form a new chromosome population.

In the evolution program of the present invention, the optimum interference level, which is 0 (whose fitness function also is the optimum value), is found in the second chromosome of the chromosome population in the $31^{st}$ generation, which is as shown in Table 3.

TABLE 3

Final Chromosome Population

| Individual | Assigned Channel | Interference Level | Value of Fitness Function |
|---|---|---|---|
| v0 | 2 8 7 10 5 1 | 1 | 1.000000 |
| v1 | 3 8 7 10 5 0 | 0 | optimum value |
| v2 | 2 8 7 10 5 1 | 1 | 1.000000 |
| v3 | 3 8 7 10 5 1 | 1 | 1.000000 |
| v4 | 1 8 7 10 5 1 | 1 | 1.000000 |
| v5 | 3 8 10 10 5 1 | 3 | 0.333333 |
| v6 | 3 8 7 10 5 1 | 1 | 1.000000 |
| v7 | 5 9 7 10 5 1 | 2 | 0.500000 |
| v8 | 3 9 7 10 5 1 | 1 | 1.000000 |
| v9 | 5 8 7 10 5 1 | 2 | 0.500000 |
| Total | | 13 | |

In the evolution program for optimum channel assignment suggested in the present invention, the genetic operation is terminated in the following situations.

1) The genetic operation is terminated, when the present generation exceeds the predetermined number of generation repetition, which is the simplest terminal condition.

2) The genetic operation is terminated, when a particular time period, during which the value of needed information is valid, is over. (The time period is presented by an information user.)

3) The genetic operation is terminated, when the change of the optimum value show little improvement from a predetermined change value, after repeating a predetermined number of generations. In other words, when the progress of the genetic algorithm is checked for a predetermined number of generations, and if the progress is smaller than a given value, the operation is terminated.

4) Since there are various evolution programs, not all the chromosomes need to be re-estimated. Some chromosomes remain intact in the next generation. Therefore, the number of functions to be estimated generally from the initial generation to the present generation should be calculated by a system administrator, and if the number of the modified and estimated functions grows larger than the number (a constant number) of functions to be estimated, which is predetermined by the system administrator, the exploration is terminated.

5) The number of the converged alleles is checked to measure the convergence of the chromosome population. Here, the convergence of alleles means that a predetermined proportion of the chromosome population has the same value as the alleles. If the number of the converged alleles exceeds the predetermined proportion of the entire alleles, the operation is terminated.

Figure 7:
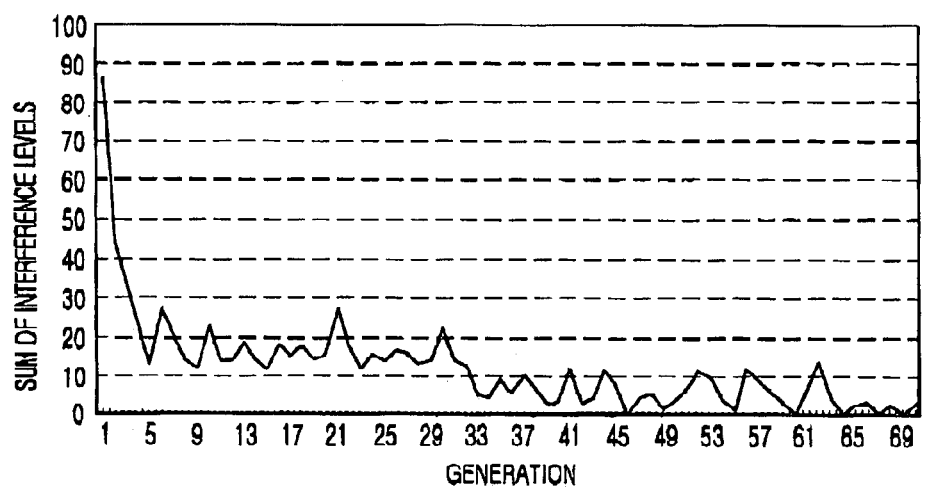
FIG. 7 is a graph showing the convergence (four cells and 11 channels) of the sum total of the interference levels of all chromosomes in each generation in accordance with the present invention.

The above conditions are all terminal conditions. If at least one of the above terminal conditions is satisfied, the evolution program is terminated, FIG. 7 shown the convergence (four cells and 11 channels) of the sum total of the interference levels of all chromosomes in each generation in accordance with the present invention, and FIG. 8 shows the convergence (25 cells and 73 channels) of the sum total of the interference levels of all chromosomes in each generation in accordance with the present invention.

Figure 8:
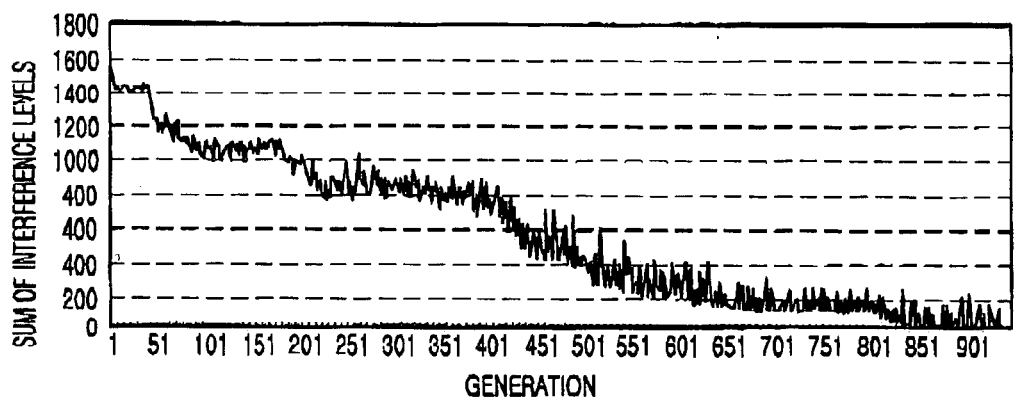
FIG. 8 a graph showing the convergence (25 cells and 73 channels) of the sum total of the interference levels of all chromosomes in each generation in accordance with the present invention.

As shown in FIG. 8, the channel demand of each cell on a radio communication network consisting of 25 cells is 167 in total, which is [10, 11, 9, 5, 9, 45, 7, 4, 8, 8, 9, 10, 7, 7, 6, 4, 5, 5, 7, 6, 4, 5, 7, 5] each cell, and the number of inherent channel numbers that can be assigned at present is 73. Following is a compatibility matrix of this case.

<Compatibility Matrix>

2 1 1 0 1 0 1 1 1 1 0 1 1 1 1 0 0 0 0 0 0 0 0 0 0
1 2 1 0 1 0 1 1 0 0 0 1 1 1 1 0 0 0 0 0 0 0 0 0 0
1 1 2 1 1 1 1 1 1 1 1 1 1 1 0 0 0 0 0 0 0 0 0 0 0
0 0 1 2 0 1 1 1 1 1 1 1 1 1 0 0 0 0 0 0 0 1 1 1 1
1 1 1 0 2 0 0 0 0 1 1 1 1 1 1 1 0 0 0 0 0 0 0 0 0
0 0 1 0 0 2 1 1 1 1 0 0 0 0 0 0 0 0 0 0 0 0 0 0 0
1 1 1 1 0 1 2 1 1 1 1 1 1 0 0 0 0 0 0 0 0 0 0 0 0
1 1 1 1 0 1 1 2 1 1 1 1 1 0 0 0 0 0 0 0 0 0 0 1 0
1 0 1 1 0 1 1 1 2 1 1 1 0 0 0 0 0 0 0 0 0 0 0 1 1
1 1 1 1 1 1 1 1 1 2 1 1 1 1 1 1 1 0 0 0 0 0 1 0 1 0
0 0 1 1 1 0 1 1 1 1 2 0 1 1 1 1 0 1 1 1 1 1 1 1 1
1 1 1 1 1 0 1 1 1 1 0 2 1 1 0 0 0 0 0 0 0 0 0 0 0
1 1 1 1 1 1 0 1 1 1 0 1 1 1 2 1 1 1 1 1 1 1 0 0 0 0 0
1 1 1 0 1 0 0 0 0 1 1 1 1 2 1 1 1 1 1 1 1 0 0 0 0 0
1 1 0 0 1 0 0 0 0 1 1 0 1 1 2 1 1 1 1 1 1 1 1 0 0 0
0 0 0 0 1 0 0 0 0 1 1 0 1 1 1 2 1 1 1 1 1 0 0 0 0 0
0 0 0 0 0 0 0 0 0 0 0 0 1 1 1 1 2 1 1 0 0 0 0 0 0
0 0 0 0 0 0 0 0 0 0 1 0 1 1 1 1 1 2 1 1 0 0 0 0 0
0 0 0 0 0 0 0 0 0 0 1 0 1 1 1 1 1 1 2 1 1 1 1 0 0
0 0 0 0 0 0 0 0 0 0 1 0 1 1 1 1 0 1 1 2 1 1 1 0 0
0 0 0 0 0 0 0 0 0 0 1 0 0 0 1 0 0 0 1 1 2 1 1 0 0
0 0 0 0 0 0 0 0 0 1 1 0 0 0 1 0 0 0 1 1 1 2 1 1 1
0 0 0 1 0 0 0 0 0 1 0 0 0 0 0 0 0 0 1 1 1 1 2 1 1
0 0 0 1 0 0 0 1 1 1 0 0 0 0 0 0 0 0 0 0 0 1 1 2 1
0 0 0 1 0 0 0 0 1 0 1 0 0 0 0 0 0 0 0 0 0 0 1 1 1 2

The sum total of interference levels of the chromosomes of this example in each generation is as shown in FIG. 8. In the matter of assigning channels to 25 cells, the optimum value of the evaluation function (i.e., interference level) is converged into the value of 0. This value is found in the $16^{th}$ chromosome of the $220^{th}$ generation. The result is as shown in Table 4.

TABLE 4

| Cell Number | Cell Demand | Assigned Channel |
|---|---|---|
| 0 | 10 | 1 14 9 25 44 39 70 60 46 18 |
| 1 | 11 | 34 36 49 58 69 10 53 40 27 12 38 |
| 2 | 9 | 61 64 21 11 29 52 13 32 6 |
| 3 | 5 | 34 23 1 27 18 |
| 4 | 9 | 22 63 30 50 5 56 65 47 67 |
| 5 | 4 | 1 7 3 9 |
| 6 | 5 | 47 17 8 50 30 |
| 7 | 7 | 57 55 63 45 22 5 59 |
| 8 | 4 | 2 20 12 4 |
| 9 | 8 | 28 24 42 37 54 68 71 31 |
| 10 | 8 | 35 38 7 9 25 14 19 33 |
| 11 | 9 | 3 73 33 43 35 7 19 62 15 |
| 12 | 10 | 66 20 41 48 72 2 16 51 4 26 |
| 13 | 7 | 55 8 17 23 59 45 57 |
| 14 | 7 | 61 52 73 29 11 43 64 |
| 15 | 6 | 13 32 15 27 40 6 |
| 16 | 4 | 9 7 1 3 |
| 17 | 5 | 28 5 21 24 30 |
| 18 | 5 | 31 42 10 36 39 |
| 19 | 7 | 37 12 1 22 3 34 18 |
| 20 | 6 | 6 13 16 4 21 23 |
| 21 | 4 | 5 27 20 2 |
| 22 | 5 | 28 15 24 11 8 |
| 23 | 7 | 29 32 21 13 6 26 16 |
| 24 | 5 | 30 22 17 3 10 |

The method of the present invention can be programmed and stored in a computer-readable recording medium, such as CD-ROMs, RAMs, ROMs, floppy disks, hard disks, optical magnetic disks, and the like.

As described above, the present invention assigns channels optimally, that in, as many channels as demanded by each cell dynamically in time of need, on a radio communication network so that resources can be used efficiently, when the number of channels demanded by each cell is varying and indefinite depending on the service area and time.

In other words, the present invention develops a dynamic channel assignment (DCA) method that minimizes interference between channels by using the evolution program (EP). The channel assignment method in accordance with the present invention has following advantages. First, an evaluation function clearly shows the difference between chromosomes, which represents channel assignment, can be set. Second, the efficiency in calculation time and memory capacity is increased by representing the assignment of channels arranged in one-dimensional using inherent channel numbers. Third, by controlling the Elitist pool crossover method and mutation probability properly, diversity is pursued in the initial process of the evolution program, and then as generation repeats, the convergence is enhanced so as to increase the efficiency in obtaining the optimum solution.

While the present invention has bean described with respect to certain preferred embodiments, it will be apparent to those skilled in the art that various changes and modifications may be made without departing from the scope of the invention as defined in the following claims.

What is claimed is:

1. A method for dynamically assigning channel in real-time based on a genetic algorithm in a radio communication system, comprising the steps of:

generating an initial chromosome by arranging inherent channel numbers in one-dimensional as many as channels demanded by each cell based on the radio communication service area;

taking a certain channel of the chromosome as a reference channel and indicating the level of interference between the reference channel and each of the other channels to estimate the initial chromosome generated above;

determining a chromosome application number $F_E$ of an Elitist pool type to be applied to each generation, and then performing crossover in a partially mapped crossover method in order not to generate the same channel in the same cell and determining the mutation probability $F_m$; and estimating the fitness level and the level of interference between the channels, and storing materials for exchanging recessive chromosomes for dominant chromosomes in the Elitist pool method according to the estimation result, and then updating the Elitist pool with the chromosomes having the highest fitness level in order.

2. The method as recited in claim 1, wherein in the process of generating the initial chromosome, inherent channel numbers generated at random within the range of the number of channels used in each chromosome are assigned, and the inherent channel numbers as many as the channels demanded by each cell are arranged in one-dimensional consecutively.

3. The method as recited in claim 1, wherein the evaluation function, so as to differentiate and estimate the evaluation function values of chromosomes, takes one channel of a chromosome as a reference channel and indicates the level of interference between the reference channel and each of the other channels based on an equation as:

$$\text{Min} \sum_{i=1}^{N} \sum_{k=1}^{D_i} \sum_{j=1}^{N} \sum_{l=1}^{D_j} P_{ij}(|X_{ik} - X_N| + 1)$$

Limitation equation:

$$P_{i,j,m+1} = \max(0, P_{i,j,m} - 1)$$

$$P_{i,j,1} = \begin{cases} C_{ij}, & \text{if } i \neq j \\ 0, & \text{if } i = j \end{cases} \quad i, j = 1, 2, 3, \ldots, N,$$

$$k = 1, \ldots, D_i, \text{ and}$$

$$l = 1, \ldots, D_j$$

where, N denotes the number of cells, $X_{iR}$ denotes an inherent channel number assigned to the $k^{th}$ gene of the $i^{th}$ cell, $P_{i,j,m}$ denotes penalty that is given when the channel difference (m−1) between the channel $X_{ik}$ and channel $X_{ji}$ breaks a compatibility matrix, $C_{ij}$ denotes a compatibility matrix, and $D_i$ denotes the channel demand of each cell, wherein the inherent channel number is selected in the range of usable channels, that is, if the number of usable channels is M, the inherent channel number is selected from 1,2, . . . , M.

4. The method as recited in claim 3, wherein the chromosome application number $F_E$ removes recessive chromosomes (chromosomes having low fitness function values) during the reproduction process to enhance the selection intensity, and increase the crossover probability of dominant chromosomes by applying the number of dominant chromosomes (chromosomes having high fitness function values), as generation repeats, is based on an equation as:

$$F_E = E - \text{Integral number}(E \times \beta^G)$$

where, $F_E$ denotes the chromosome application number of the Elitist pool to be applied to a generation G, E, β and G denote the maximum application number, weight (0<β<1), and generation (0,1,2,3, . . . , N), respectively, wherein the 'integral number' is determined by removing the decimal fraction from a real number and in the Elitist pool method.

5. The method as recited in claim 4, wherein the mutation probability $F_m$ is decreased, as generations repeats, and the mutation is performed as many times as the random numbers that are smaller than the mutation probability, after random numbers are generated as many as the chromosomes of the chromosome population.

$$F_m = m \cdot \alpha^G$$

where, $F_m$ denotes the mutation probability to be applied to a generation G, while α, m and G denote a weight (0<α<1), a mutation probability given to the initial period, and a generation (0,1,2,3, . . . , N), respectively.

6. The method as recited in claim 5, wherein the partially mapped crossover (PMX) method includes the steps of:

pairing two chromosomes to be crossed over, determining crossover points randomly and exchanging the gene string of one chromosome in the crossover portion with the gene string of the other chromosome, and if the genes inserted in the partially mapped crossover (PMX) method and the genes, which have originally been in the chromosome, have the same inherent channel number in the same cell, changing the repeated channel number into the channel number that has been extracted after the crossover so as not to have the same channel in the same cell.

7. A computer-readable recording medium for recording a program for executing a method for dynamically assigning a channel in real time based on a genetic algorithm in a radio communication system provided with a processor, comprising the step of:

generating an initial chromosome by arranging inherent channel numbers in one-dimensional as many as channels demanded by each cell based on the radio communication service area;

taking a certain channel of the chromosome as a reference channel and indicating the level of interference between the reference channel and each of the other channels to estimate the initial chromosome generated above;

determining a chromosome application number $F_E$ of an Elitist pool type to be applied to each generation, and then performing crossover id a partially mapped crossover method in order not to generate the same channel in the same cell and determining the mutation probability $F_m$; and estimating the fitness level and the level of interference between the channels, and storing materials for exchanging recessive chromosomes for dominant chromosomes in the Elitist pool method according to the estimation result, and then updating the Elitist pool with the chromosomes having the highest fitness level in order.

* * * * *